(12) United States Patent
Hsu

(10) Patent No.: US 7,012,596 B2
(45) Date of Patent: Mar. 14, 2006

(54) COLOR THIN FILM TRANSISTOR DISPLAY MODULE WITH SHIELDING-EFFECT CABLE

(75) Inventor: Jui-Hung Hsu, Taipei (TW)

(73) Assignee: High Tech Computer Corporation, Taoyuan (TW)

( * ) Notice: Subject to any disclaimer, the term of this patent is extended or adjusted under 35 U.S.C. 154(b) by 442 days.

(21) Appl. No.: 09/909,854

(22) Filed: Jul. 23, 2001

(65) Prior Publication Data

US 2002/0140669 A1 Oct. 3, 2002

(30) Foreign Application Priority Data

Mar. 29, 2001 (TW) ...................................... 90204881 U

(51) Int. Cl.
G09G 5/00 (2006.01)

(52) U.S. Cl. .......................................... 345/204; 174/33
(58) Field of Classification Search ................. 345/156, 345/204; 174/33, 34, 117 F, 261, 51, 255, 174/262, 117
See application file for complete search history.

(56) References Cited

U.S. PATENT DOCUMENTS

| RE31,477 E | * | 12/1983 | Marshall | 174/115 |
| 5,838,400 A | * | 11/1998 | Ueda et al. | 349/58 |
| 6,444,922 B1 | * | 9/2002 | Kwong | 174/261 |
| 6,558,008 B1 | * | 5/2003 | Salerno et al. | 353/122 |

FOREIGN PATENT DOCUMENTS

| JP | 10-50413 | 2/1998 |
| JP | 11-109879 | 4/1999 |
| JP | 2000-347208 | 12/2000 |
| JP | 2001-68907 | 3/2001 |

\* cited by examiner

Primary Examiner—Regina Liang
Assistant Examiner—Jennifer T. Nguyen
(74) Attorney, Agent, or Firm—Rabin & Berdo, P.C.

(57) ABSTRACT

A color Thin Film Transistor (TFT) display module with shielding-effect cable includes a color TFT display, a grounding terminal and a cable. The grounding terminal is installed at the rear of the color TFT display, while the cable, being electrically connected with the color TFT display and the grounding terminal, has a number of signal lines and micro-strip grounding pieces. Of which, the signal lines are electrically connected with the color TFT display, whilst the micro-strip grounding pieces, being connected with the grounding terminal, are interlaced with the signal lines.

13 Claims, 3 Drawing Sheets

COLOR THIN FILM TRANSISTOR DISPLAY MODULE WITH SHIELDING-EFFECT CABLE

This application incorporates by reference Taiwanese application Serial No. 90204881, Filed Mar. 29, 2001.

BACKGROUND OF THE INVENTION

1. Field of the Invention

The invention relates in general to a color thin film transistor (TFT) display module, and more particularly to a color TFT display module equipped with shielding-effect cable.

2. Description of the Related Art

In today's society where technology advances and changes rapidly, Personal Digital Assistant (PDA) has become an indispensable appliance for modern people. The PDA, which is light in weight, small in size and handy to carry with, allows the users to arrange their schedules and take immediate memos. The PDA even has digital mobile phone function such as Global System for Mobile Communication (GSM), General Packet Radio Service (GPRS) or Wide-Band Code-Division Multiple Access (CDMA). The user can make or receive phone calls using a PDA as they would use a mobile phone.

Please refer to FIG. 1A, a three-dimensional block diagram of a PDA with GSM, GPRS and Wide-Band CDMA functions is illustrated. In FIG. 1A, the PDA 100 includes: a base unit 102, a color Thin Film Transistor (TFT) Liquid Crystal Display Module (LCM) 104, three control buttons 106, a contact pen 108, a transmitter 110 and a receiver 112. The color TFT LCM 104 includes a TFT Liquid Crystal Display (LCD) 114 and the cable 116. The color TFT LCD 114 is located on the base unit's top face 109 of the base unit 102, while the cable 116 is electrically connected with the color TFT LCD 114. The cable 116 can be further electrically connected with a circuit board inside a PDA (not shown here), such that the cable 116 becomes the medium of message transmission between the color TFT LCD 114 and the circuit board. Apart from that, the three control buttons 106 line up at intervals on the base unit's top face 109 for users' manipulation, while the contact pen 108 slides into a stylus slot 122 of the base unit 102 along with the direction of an arrow 160 shown in FIG. 1A, lest the contact pen 108 might be mislaid. Furthermore, a transmitter 110 and a receiver 112 that the users talk and hear with, being installed on the base unit's top face 109, are located at the top end and button end of the face of the color TFT LCD 114 respectively Touching the color TFT LCD 114 lightly using the contact pen 108, the users can input messages into the PDA 100 to manipulate it. The user can even input telephone numbers into the PDA 100 to make a phone call by touching the color TFT LCD 114 lightly using the contact pen 108. When the line is connected, the user can talk and hear using the transmitter 110 and the receiver 112 respectively. It is indeed very convenient for the user to receive a phone call using the PDA 100.

Please refer to FIG. 1B, an upward view of the color TFT LCM in FIG. 1A, which is exactly the block diagram of the rear of the color TFT LCD 114, is illustrated. In FIG. 1B, the rear of the color TFT LCM is installed with a plastic casing 130, while the cable 116 achieve a color screen display of the color TFT LCD 114 by means of 90 signal lines 126 as illustrated in FIG. 1C. Of which, FIG. 1C is an enlargement of a sectional view of a cable along the section line 1C—1C in FIG. 1B. In FIG. 1C, the 90 signal lines 126 line up at a fixed interval of equal distance, while the signal line 126 can be further enclosed with a plastic body 150 to protect the inner structures of the signal line 126 and the cable 116. It is noteworthy that when making a phone call using the PDA 100 in FIG. 1A, it might end up with a poor quality of signal receiving and, therefore, a failed result of GCF for the handset regarding the verification of GSM, GPRS and Wide-Band CDMA. This is due to noises occur when the signal lines 126 are transmitting signals, resulting in an Electro-magnetic Interference (EMI) effect which interferes with the signal line 126 when making a phone call.

SUMMARY OF THE INVENTION

It is therefore an object of the invention to provide a color TFT display module with shielding-effect cable, which can be installed within a PDA having a digital mobile phone function such as Global System for Mobile Communication (GSM), General Packet Radio Service (GPRS) or Wide-Band Code-Division Multiple Access (CDMA). The color TFT display module in the invention is designed in such a way that its micro-strip grounding pieces are interlaced with signal lines, producing a shielding effect for the micro-strip grounding piece, which prevents the users from being interfered with by the EMI effect of the signal line when they are making a phone call. A better quality of signal receiving is thus achieved. Whereas the micro-strip grounding piece can be electrically connected to a metallic casing via a metallic layer, a gold-plated metallic anti-oxidized grounding pad and a metallic linking piece, giving the micro-strip grounding piece absolute grounding effect to prevent the micro-strip grounding piece from producing additional open type antenna effect.

According to the object of the invention, a shielding effect cable with a number of signal lines and micro-strip grounding pieces is provided, wherein the micro-strip grounding pieces are interlaced with the signal lines.

According to another object of the invention, a shielding effect cable used to be electrically connected with a color TFT display module is provided, wherein the color TFT display module has a color TFT display and a grounding terminal, while the cable includes a number of signal lines and micro-strip grounding pieces. Among which, the signal lines are electrically connected with the color TFT display, while the micro-strip grounding pieces, being electrically connected with the grounding terminal, are interlaced with the signal lines.

It is another object of the invention to provide a color TFT display module with shielding-effect cable, including a color TFT display, a grounding terminal and a cable, wherein the grounding terminal is installed at the rear of the color TFT display, while the cable, being electrically connected with the color TFT display and the grounding terminal, includes a number of signal lines and micro-strip grounding pieces. Among which, the signal lines are electrically connected with the color TFT display, while the micro-strip grounding pieces, being electrically connected with the grounding terminal, are interlaced with the signal lines.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

A cable with shielding effect is designed according to the invention, including a number of signal lines and micro-strip grounding pieces. The micro-strip grounding pieces and signal lines are interlaced in such a way that the shielding effect of the micro-strip grounding pieces prevents the signal lines from producing Electro-magnetic Interference (EMI) effect. Furthermore, the micro-strip grounding piece can be electrically connected to a metallic casing via a metallic layer, a gold-plated metallic anti-oxidized grounding pad and a metallic linking piece, giving the micro-strip grounding piece absolute grounding effect to prevent the micro-strip grounding piece from producing additional open type antenna effect.

The cable in the invention can be further electrically connected with a color Thin Film Transistor (TFT) display of a color TFT display module. The color TFT display module can be installed in a Personal Digital Assistant (PDA), which has a device of digital mobile phone function such as Global System for Mobile Communication (GSM), General Packet Radio Service (GPRS) or Wide-Band Code-Division Multiple Access (CDMA). As a consequence, the cable in the invention prevents the user from being interfered with by the EMI effect generated by the signal line when making a phone call via a PDA. Hence a better quality of telephone communication can be achieved.

Figure 1A:
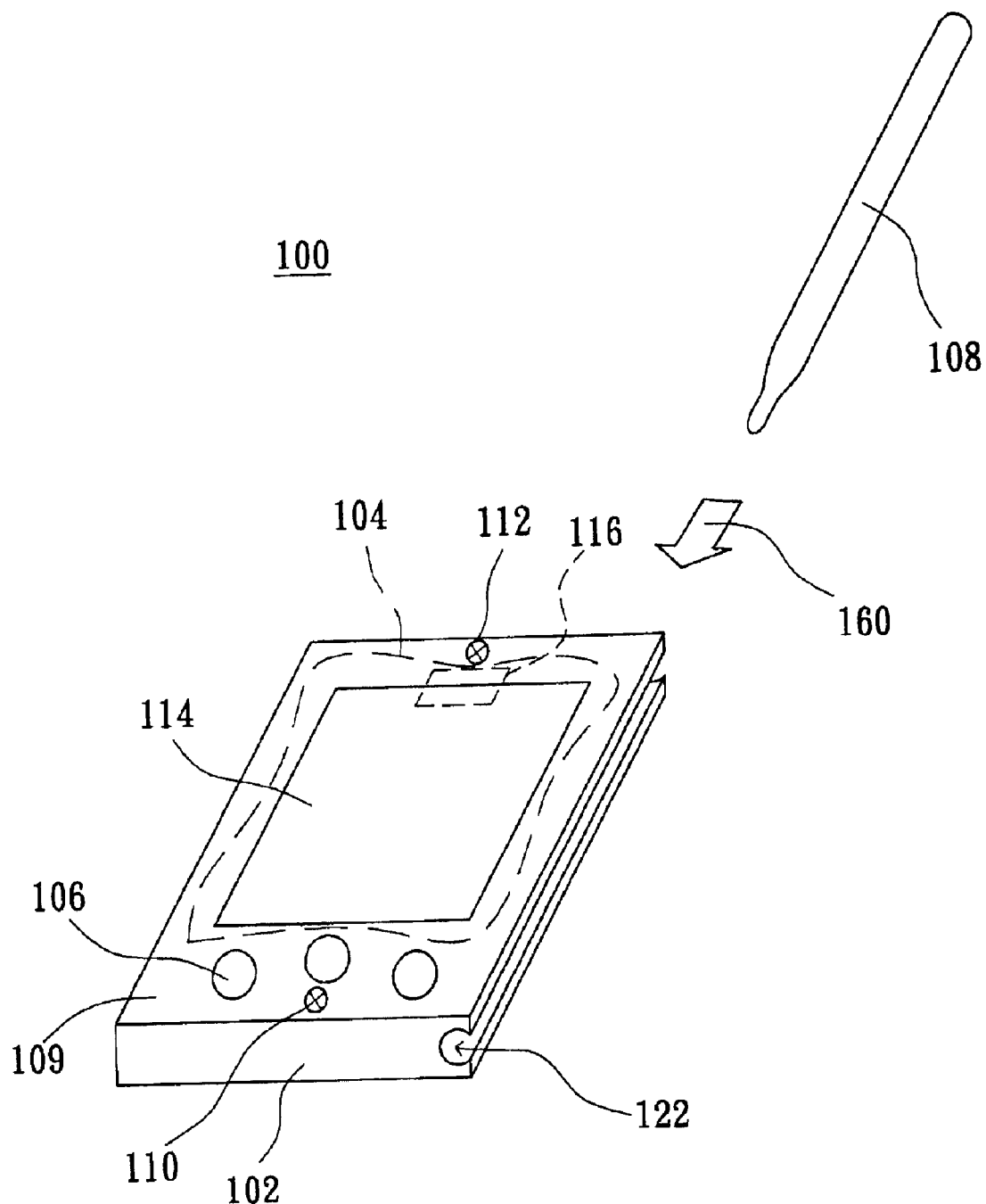
FIG. 1A shows a three-dimensional block diagram of a personal digital assistant with GSM, GPRS and Wide-Band CDMA functions.
Figure 1B:
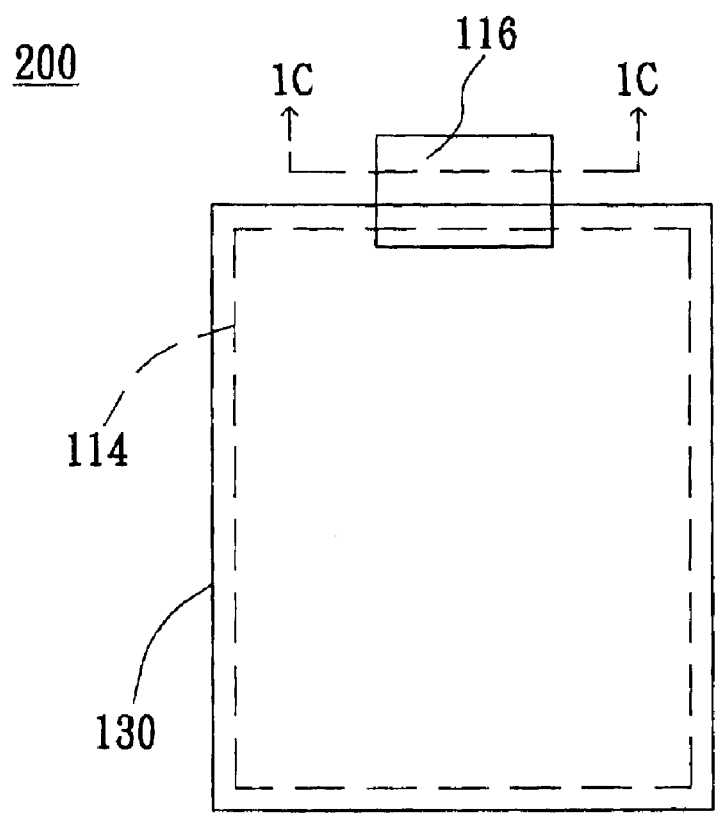
FIG. 1B shows an upward view of the color TFT LCM in FIG. 1A.
Figure 1C:
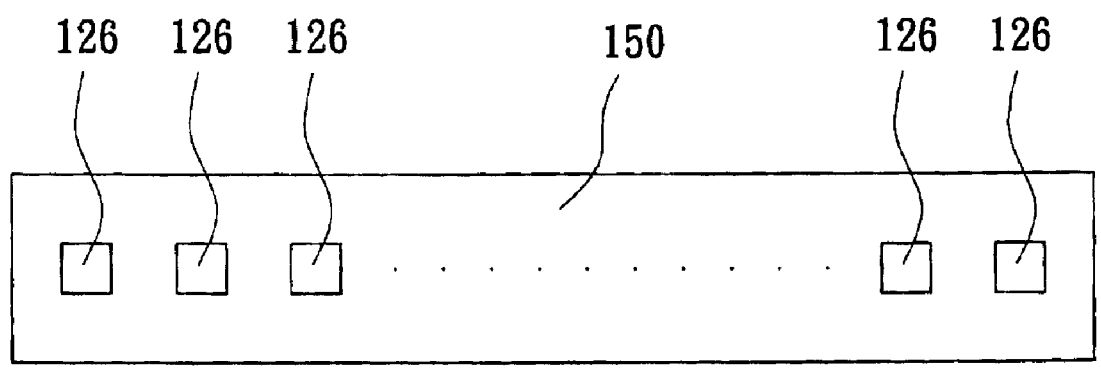
FIG. 1C shows an enlargement of a sectional view of a cable along the section line 1C—1C in FIG. 1B.
Figure 2A:
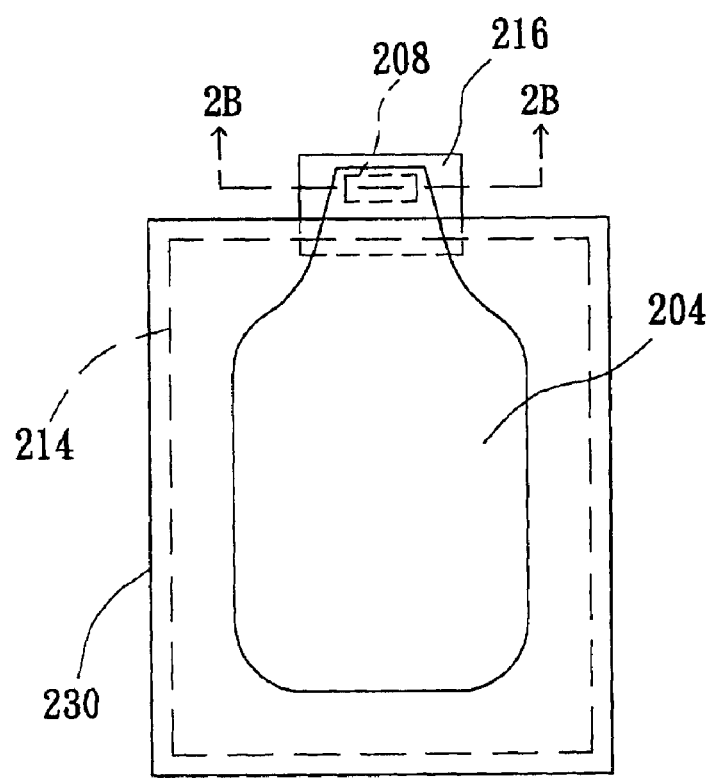
FIG. 2A shows an upward view of a thin film transistor display module with shielding-effect cable according to a preferred embodiment of the invention.

Referring to FIG. 2A, an upward view of a color TFT display module with shielding-effect cable according to a preferred embodiment of the invention, which is exactly the block diagram of the rear of the color TFT display module, is illustrated. Of which, the color TFT display module can be a color TFT Liquid Crystal Display Module (LCM) 200. FIG. 2A differs from FIG. 1A in that the rear of the color TFT Liquid Crystal Display (LCD) 214 of the color TFT LCM 200 is equipped with a metallic casing 230, an iron casing for instance. A linking piece 204 is installed on the metallic casing 230 and the gold-plated metallic anti-oxidized pad 208 of the cable 216, such that the metallic casing 230 and the gold-plated metallic anti-oxidized pad 208 are electrically connected. The gold-plated metallic anti-oxidized pad 208 is used to prevent the inner structure of the cable 216 from being oxidized. Of which, the metallic linking piece 204 can be a copper foil linking piece, while the gold-plated metallic anti-oxidized pad 208 can be a gold pad.

Figure 2B:
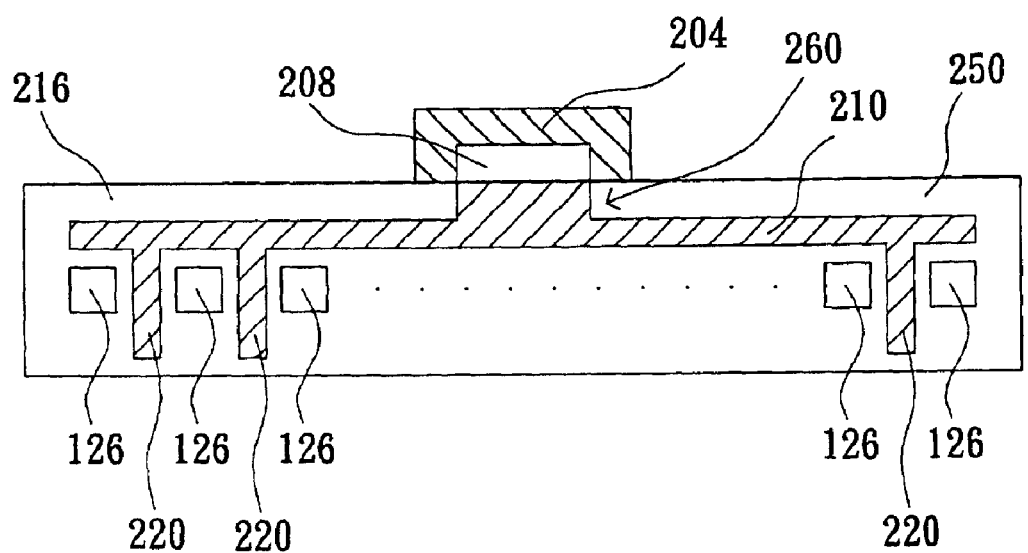
FIG. 2B shows an enlargement of a sectional view of the metallic linking pieces and cables along the section line 2B—2B in FIG. 2A.

Referring to FIG. 2B, an enlargement of a sectional view of the metallic linking piece and cable along the section line 2B—2B in FIG. 2A is illustrated. FIG. 2B differs from FIG. 1A in that the cable 216 in FIG. 2B is further equipped with a metallic layer 210 and 89 micro-strip grounding pieces 220. The 89 micro-strip grounding pieces 220 are interlaced with the 90 signal lines 126, with the metallic layer 210 being located beside the signal line 126 and the micro-strip grounding piece 220 being electrically connected with the metallic layer 210. The micro-strip grounding piece 220 of the invention separates every two adjacent signal lines 126, giving the micro-strip grounding piece 220 absolute shielding effect, such that the EMI effect generated from within the 90 signal lines 126 will not interfere with the signal transmission of the telephone. Of which, the metallic layer 210 can be a copper foil layer, while the micro-strip grounding piece 220 can be made of copper.

Furthermore, a plastic body 250 according to the invention is used to enclose the signal line 126, the metallic layer 210 and the micro-strip grounding piece 220, wherein the plastic body 250 has an opening 260 on which a gold-plated metallic anti-oxidized pad 208 is installed. The gold-plated metallic anti-oxidized pad 208, being electrically connected with the metallic layer 210, not only prevents the oxidization of the metallic layer 210, but also avoids the grounding signal originating from the micro-strip grounding piece 210 and the metallic layer 210 which links with the cable 216. In order to give the metallic layer 210 a better grounding effect to avoid the EMI effect originating from the signal line 126, the invention particularly installs the metallic linking piece 204 on the gold-plated metallic anti-oxidized pad 208 and the metallic casing 202. By doing so, the metallic layer 210 will be electrically connected with the metallic casing 202 via the gold-plated metallic anti-oxidized pad 208 and the metallic linking piece 204. The induced electromagnetic field, which is generated by the metallic layer 210 and the micro-strip grounding piece 220 due to the noise of the signal line 126, will be evenly shared by and converted to the metallic casing 202 and the circuit board (not shown here) inside the color TFT LCM 200, giving the micro-strip grounding piece 220 absolute grounding effect. The metallic linking piece 204 has virtually become the grounding terminal of the micro-strip grounding piece 220. Besides its shielding effect against the signal line 126, the micro-strip grounding piece 220 further avoids producing additional open type antenna effects.

The color TFT display module with shielding-effect cable as disclosed in the preferred embodiment according to the invention can be installed in a PDA with GSM function. The color TFT display module according to the invention, with its micro-strip grounding pieces being interlaced with the signal lines, provides the micro-strip grounding pieces with shielding effect. The user will not be interfered with by the EMI effect originating from the signal lines when he or she is making a phone call. Thus a better quality of telecommunication can be achieved. The micro-strip grounding piece is electrically connected with the metallic casing via the metallic layer, the gold-plated metallic anti-oxidized pad and the metallic linking piece, giving the micro-strip grounding piece absolute grounding effect to prevent the micro-strip grounding piece from producing additional open type antenna effect.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cable with shielding effect, comprising:

a plastic body;

a plurality of signal lines received in the plastic body;

a plurality of micro-strip grounding pieces which are received in the plastic body and interlaced with the signal lines;

a metallic layer received in the plastic body, located beside the signal lines and electrically connecting with the grounding pieces; and a metallic linking piece located outside the plastic body and electrically connecting with the metallic layer, adapted for electrically connecting with a metallic member.

2. A cable with shielding effect used to be electrically connected with a color Thin Film Transistor (TFT) display module, wherein the color TFT display module includes a color TFT display, the cable comprising:

a plastic body;

a plurality of signal lines which are received in the plastic body and electrically connected with a color TFT display;

a plurality of micro-strip grounding pieces, which are received in the plastic body and interlaced with the signal lines; and a metallic linking piece located outside the plastic body and electrically connecting with the grounding pieces, adapted for electrically connecting with a grounding terminal.

3. A color TFT display module with shielding-effect cable, comprising:

a color TFT display; and a cable comprising:

a plastic body;

a plurality of signal lines which are received in the plastic body and electrically connected with the color TFT display;

a plurality of micro-strip grounding pieces, which are received in the plastic body and interlaced with the signal lines;

a metallic layer received in the plastic body, located beside the signal lines and electrically connecting with the grounding pieces;

a grounding terminal;

a metallic linking piece having a first portion electrically connecting with the metallic layer and a second portion electrically connecting with the grounding terminal.

4. A color TFT display module according to claim 3, wherein the micro-strip grounding pieces are copper pieces.

5. A color TFT display module according to claim 3, wherein the grounding terminal is a metallic casing.

6. A color TFT display module according to claim 5, wherein the metallic casing is an iron casing.

7. A color TFT display module according to claim 3, wherein the metallic layer is a copper foil layer.

8. A color TFT display module according to claim 3, further comprising:

a gold-plated metallic anti-oxidized grounding pad, which is installed on and electrically connected with the metallic layer, preventing the metallic layer from being oxidized, wherein the first portion of the metallic linking piece is electrically connected with the gold-plated metallic anti-oxidized grounding pad.

9. A color TFT display module according to claim 8, wherein the gold-plated metallic anti-oxidized grounding pad is a gold pad.

10. A color TFT display module according to claim 3, wherein the metallic linking piece is a copper foil.

11. A color TFT display module according to claim 3, wherein the color TFT display is a color TFT Liquid Crystal Display (LCD).

12. A color TFT display module according to claim 3 is installed in a Personal Digital Assistant (PDA).

13. A color TFT display module according to claim 12, wherein the PDA has a device of digital mobile phone function such as Global System for Mobile Communication (GSM), General Packet Radio Service (GPRS) or Wide-Band Code-Division Multiple Access (Wide-Band CDMA).

\* \* \* \* \*